US006405595B1

(12) United States Patent
Harrison

(10) Patent No.: US 6,405,595 B1
(45) Date of Patent: Jun. 18, 2002

(54) APPARATUS FOR MEASURING TORSIONAL STIFFNESS OF A GOLF SHAFT

(75) Inventor: John W. Harrison, Glendale, AZ (US)

(73) Assignee: Karsten Manufacturing Corp., Phoenix, AZ (US)

( * ) Notice: Subject to any disclaimer, the term of this patent is extended or adjusted under 35 U.S.C. 154(b) by 0 days.

(21) Appl. No.: 09/374,193

(22) Filed: Aug. 13, 1999

(51) Int. Cl.⁷ .................................................. G01L 3/00
(52) U.S. Cl. ............................. 73/573; 73/650; 73/814
(58) Field of Search ......................... 73/573, 574, 847, 73/814, 650, 854; 702/43, 56

(56) References Cited

U.S. PATENT DOCUMENTS

| 3,473,370 A | 10/1969 | Marciniak | 73/65 |
|---|---|---|---|
| 3,698,239 A | 10/1972 | Everett, III | 73/65 |
| 3,963,236 A | 6/1976 | Mann | 273/77 |
| 3,995,820 A | 12/1976 | Einhorn | 248/216 |
| 3,995,857 A | 12/1976 | Cochran et al. | 273/77 |
| 3,995,858 A | 12/1976 | Cochran et al. | 273/77 |
| 3,995,864 A | 12/1976 | Cochran et al. | 273/164 |
| 3,995,865 A | 12/1976 | Cochran et al. | 273/167 |
| 4,175,440 A | * 11/1979 | Booth | 73/865.3 |
| 4,212,193 A | 7/1980 | Turley | 73/65 |
| 4,682,504 A | * 7/1987 | Kobayashi | 73/854 |
| 5,018,382 A | 5/1991 | Kelley et al. | 73/65 |
| 5,318,296 A | 6/1994 | Adams et al. | 273/77 |
| 5,379,641 A | * 1/1995 | Paasivaara et al. | 73/579 |
| 5,731,524 A | * 3/1998 | Matsumoto et al. | 73/814 |
| 5,773,717 A | * 6/1998 | Reinhardt | 73/146 |
| 5,952,580 A | * 9/1999 | Haas | 73/783 |

* cited by examiner

Primary Examiner—Hezron Williams
Assistant Examiner—Jacques Saint-Surin
(74) Attorney, Agent, or Firm—Darrell F. Marquette; John D. Titus

(57) ABSTRACT

An apparatus for determining the torsional stiffness of a shaft comprises a rigid frame having a collet for securing one end of the shaft to be measured the rigid frame. A second collet secures the opposite end of the shaft to an inertial weight, which is supported for rotation by a separate bearing so that the inertial weight introduces no axial load in the shaft being measured. The inertial weight has mounted to it a biaxial accelerometer, optical gate or other electronic means for measuring the torsional frequency of the shaft/weight combination. When the inertial weight is displaced from the initial static position and released, the inertial weight oscillates about its center of mass under the urging of the torsional stiffness of the shaft. A computer is programmed with the mass moment of inertia of the inertial weight and therefore is able to solve the differential equation of motion for the torsional spring constant of the shaft based on the frequency of oscillation.

18 Claims, 4 Drawing Sheets

APPARATUS FOR MEASURING TORSIONAL STIFFNESS OF A GOLF SHAFT

BACKGROUND

This invention relates to an apparatus for measuring physical properties of golf club shafts, specifically to an apparatus for measuring the torsional stiffness (torsional spring constant) of a golf club shaft.

In the field of designing, modifying and fitting golf clubs, it is advantageous to know the physical properties of the golf club shaft as well as the physical properties of the golf club head. It is common in the industry to rate clubs based on the flexural stiffness designated typically by the terms: Extra Stiff (XS); Stiff (S); Firm (F); Regular (R); Average (A); and Ladies' (L). The flexural stiffness is important, of course, because it determines the maximum bending as well as the first bending mode frequency of the shaft and, therefore, by selecting the appropriate shaft stiffness, the club can be optimized for the swing speed of the particular golfer. The torsional stiffness of the golf club shaft is of equal importance because it determines the maximum windup of the club head relative to the shaft and the torsional frequency at which the club head oscillates about the axis of the golf club shaft during the swing. For optimum performance, in addition to matching the flexural stiffness of the shaft to the player's swing speed, the torsional stiffness of the shaft should also be matched to the club head swing weight and the player's swing speed.

Prior art methods for determining the torsional stiffness of a golf club shaft comprise fixing one end of the shaft in a collet or chuck then applying a predetermined torque (one to five foot pounds is a standard) to the opposite end of the shaft. The total angular deflection of the shaft is then read. In order to obtain sufficient resolution, a relatively high torque, must be used, therefore, in order to ensure the shaft does not move in the fixture under the high torque, a relatively high clamping force must be used. This results in many of the exotic composite shafts being crushed by the clamping force exerted by the collet on the end of the shaft. In order to avoid crushing the composite shafts, many manufacturers have resorted to using a lower torque on composite shafts and high torque on steel shafts, with the result that there is now no longer a consistent scale to compare the flexural stiffness of composite shafts to steel shafts or indeed in many cases clubs of the same type from manufacturer to manufacturer. Accordingly, what is needed is an apparatus for measuring the torsional stiffness of a golf club shaft that has sufficient resolution to measure small differences in the torsional stiffness of steel shafts without requiring high torque (and high clamping forces) that can damage composite shafts.

SUMMARY OF THE INVENTION

The present invention satisfies the foregoing need by providing an apparatus and method for determining torsional stiffness of a shaft by measuring the torsional frequency at which the shaft oscillates when coupled to a torsional weight having a known mass moment of inertia. In a preferred embodiment of an apparatus for determining the torsional stiffness of a golf club shaft incorporating features of the present invention, a collet is provided for securing one end of a shaft to the rigid frame of the apparatus. A second collet secures the opposite end of the shaft to an inertial weight. The inertial weight has mounted to it a conventional biaxial accelerometer. When the inertial weight is displaced from the initial static position and released, the inertial weight oscillates about its center of mass under the urging of the torsional stiffness of the golf club shaft. The accelerometer provides a signal indicative of the amplitude and frequency of oscillation of the inertial mass which is fed into a computer. The computer is programmed with the mass moment of inertia of the inertial weight and therefore is able to solve the differential equation of motion for the torsional spring constant of the golf club shaft based on the frequency of oscillation. The torsional spring constant can be displayed directly in Newton meters per radian (or any other engineering unit) or can be converted into units directly comparable to the prior art measurement systems by multiplying the spring constant by the appropriate load (e.g. five foot pounds).

BRIEF DESCRIPTION OF THE DRAWING

The present invention will be better understood from a reading of the following detailed description, taken in conjunction with the accompanying drawing figures in which like references designate like elements and on which.

DETAILED DESCRIPTION

Figure 1:
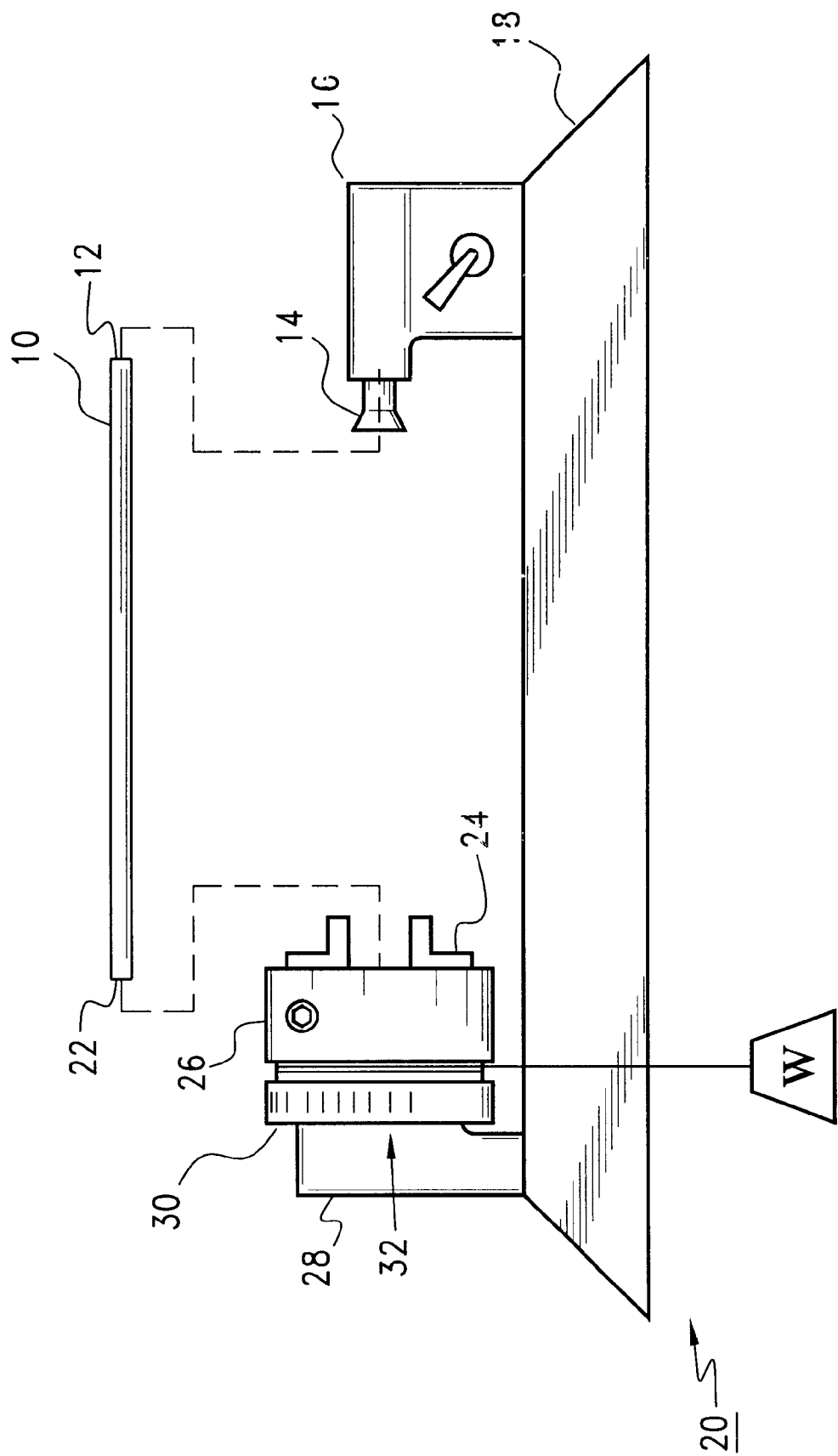
FIG. 1 is a side elevation view of an apparatus for measuring torsional stiffness of a golf club shaft according to the prior art.

The drawing figures are intended to illustrate the general manner of construction and are not necessarily to scale. In the description and in the claims, the terms left, right, front and back and the like are used for descriptive purposes. However, it is understood that the embodiment of the invention described herein may be capable of operation in other orientations than are shown and the terms so used are for the purpose of describing relative positions and are interchangeable under appropriate circumstances.

As discussed hereinbefore, the prior art method for determining the torsional stiffness of a golf club shaft comprises exerting a known torque on a sample shaft and measuring the resulting angular deflection of the shaft. An apparatus for carrying out the aforementioned measurement is shown in FIG. 1. To carry out the measurement, the shaft 10 is placed with a first end 12 in a collet 14 supported by a tailstock 16 mounted to the frame 18 of the apparatus 20. The second end 22 of shaft 10 is secured between movable jaws 24 of a chuck 26. Chuck 26 is freely rotatable about an arm 28 mounted to the end of frame 18 opposite that of tailstock 16. A weight "W" is suspended from chuck 26 so as to provide a known torque on chuck 26 about its axis. The resulting angular deflection of chuck 26 is determined with reference to the movement of a calibrated scale 30 against a point of reference 32.

In order for accurate determinations of torsional stiffness to be made, it is obviously imperative that shaft 10 be clamped tightly between collet 14 and jaws 24 so that no slippage occurs. As discussed hereinbefore, in order to provide sufficient resolution to determine small differences in torsional stiffness between relatively stiff shafts, such as steel shafts, a relatively large amount of torque must be applied to shaft 10. However, where a large torque is applied and it is necessary to ensure that no slippage occurs between the shaft 10 and collet 14 or shaft 10 and chuck 26, relatively large clamping forces must be applied to shaft 10. This may result in undesirable damage or even destruction of the shaft itself. If a lesser torque is used, resolution suffers and if different torques are used for steel shafts versus the more flexible composite shafts, inconsistent measurement standards will result. Moreover, due to the static nature of the prior art measurement method, measurement precision suffers as a result of hysteresis caused by static to dynamic friction transition ("stiction") of the rotating chuck. Finally, the prior art method provides only one data point from which to determine the torsional spring constant of the shaft. For steel shafts which exhibit a linear spring constant (at least up to the elastic limit) a single data point is adequate. However, many composite shafts do not exhibit a linear torsional spring constant and, therefore, a single data point may provide a misleading indication of the effective torsional stiffness of the club when in use.

Figure 2:
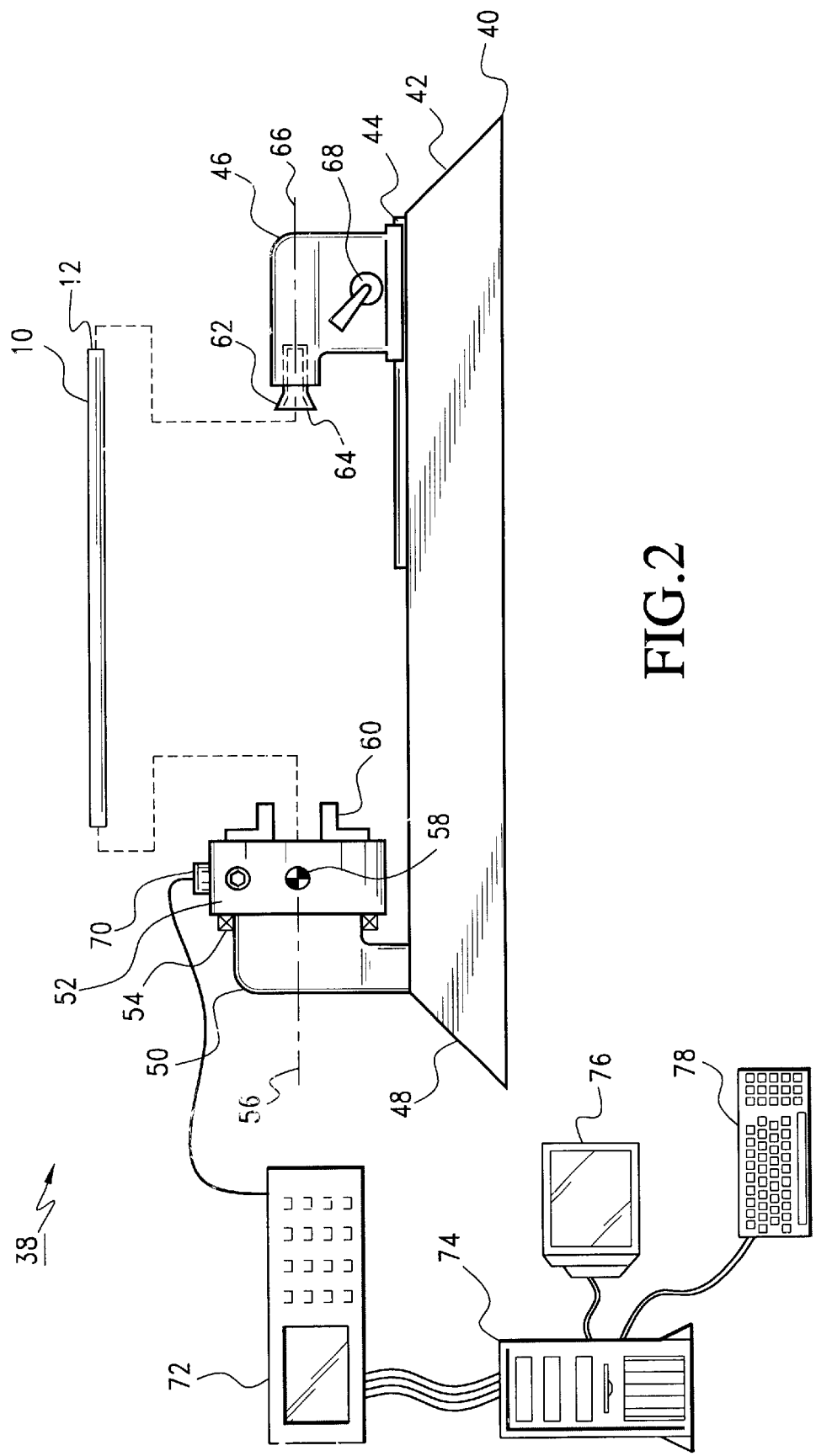
FIG. 2 is a partial schematic side elevation view of an apparatus for measuring torsional stiffness of a golf club shaft incorporating features of the present invention.

FIG. 2 is a partial schematic side elevation view of an apparatus incorporating features of the present invention. The apparatus comprises a frame 40 the first end 42 of which has a track 44 on which is mounted a tailstock 46. At the second end 48 of frame 40 is a support arm 50 on which is mounted a chuck 52. Chuck 52 is supported on support arm 50 by bearing 54, which permits chuck 52 to rotate freely about an axis of rotation 56 passing through the center of mass 58 of chuck 52. Chuck 52 has movable jaws 60 which are adapted to grip shaft 10 such that the longitudinal axis of shaft 10 is substantially co-linear with axis of rotation 56. By "substantially" co-linear, what is meant herein is that the shaft is co-linear within reasonable manufacturing tolerances or at least sufficiently co-linear that the resulting eccentricity does not result in more than a five to ten percent inaccuracy in the measured torsional stiffness.

Tailstock 46 further comprises a collet 62 having a longitudinal aperture 64 adapted to receive and clamp first end 12 of shaft 10. The longitudinal axis 66 of aperture 64 is substantially co-linear with axis of rotation 56 such that when shaft 10 is clamped between collet 62 and movable jaws 60, it is constrained to move in substantially pure torsion as chuck 52 rotates about axis of rotation 56. In order to permit apparatus 38 to accommodate shafts of different length, tailstock 46 is movable toward and away from chuck 52 on track 44 and is selectively secured to track 44 by clamp 68. Preferably track 44 comprises a conventional dove-tail bed similar to the tailstock bed found on a conventional lathe. An accelerometer 70 such as a biaxial accelerometer chip such as VTI Hamlin SCA600 is mounted to chuck 52 such that the axis of sensitivity is oriented in the tangential plane relative to axis of rotation 56. Preferably accelerometer 70 is mounted at the top or bottom of chuck 52 when the shaft 10 is in the neutral position so as to minimize any offset caused by the earth's gravitational field. The analog output of accelerometer 70 may be fed into an analog to digital converter 72 such as a model PCB482A17 signal conditioner prior to conversion into digital data which can be read by a conventional digital computer 74 for processing. Results may be displayed on a conventional screen 76 in response to operator inputs through keyboard 78.

As is well known, for a torsional spring such as a shaft displaced angularly about its axis, the torsional spring constant can be expressed by the equation $$T = -K f \quad (1)$$

When "K" is the torsional spring constant in units of torque per radian; "T" is the torque applied to the shaft and θ is the displacement of the shaft in radians. Since the force exerted by the shaft resisting the torque is in the opposite direction as the torque, the sign of "K" is negative.

For a torsional system comprising a torsional mass such as a large disk supported by a torsional spring, in which the mass of the spring is small enough relative to the mass of the disk that the mass of the spring can be ignored, then according to Newton's Law:

$$T = I\ddot{\theta} \quad (2)$$

Where "T" is torque ë is angular acceleration and "I" is the mass moment of inertia of the inertial mass. Combining equations 1 and 2 yields:

$$I\ddot{\theta} = -K\theta$$

$$\ddot{\theta} + (K/I)\theta = 0$$

$$\ddot{\theta} + \Omega^2\theta = 0$$

$$\ddot{\theta} + \omega^2\theta = 0 \quad (3)$$

Where $\omega = \sqrt{K/I}$ \quad (4)

Where ω is the circular frequency of the torsional system.

Since the units of ω are radians per second and the output of the accelerometer is most conveniently expressed in terms of cycles per second (Hertz), equation 4 may be expressed as:

$$2\pi F = \sqrt{K/I}$$

$$4\pi^2 F^2 = K/I$$

$$K = I(4\pi^2)F^2 \quad (5)$$

Where "F" is frequency in Hertz (i.e. cycles/second).

As can be determined from equation 5, if the moment of inertia is known, the spring constant "K" of shaft 10 can be determined directly from the measured frequency of oscillation. Although it would be possible to calculate the mass moment of inertia of chuck 52 based on its density and geometry, in practice apparatus 38 is calibrated by clamping a shaft having a known torsional spring constant in apparatus 38 and measuring the frequency of oscillation of the known shaft. With the spring constant "K" of the calibration shaft and frequency "F" known from the measurement, the mass moment of inertia "I" of chuck 52 can be determined from equation 5. Once the mass moment of inertia "I" of chuck 52 is known, shafts having unknown torsional stiffness can be analyzed based on the mass moment of inertia determined using the calibrated shaft. As noted in the foregoing, for maximum accuracy, the moment of inertia "I" of the inertial mass (chuck 52) must be large relative to the mass of the shaft being tested 10. Accordingly, in the embodiment of FIG. 2, chuck 52 is typically made of steel two or more inches thick and six or more inches in diameter.

Figure 3:
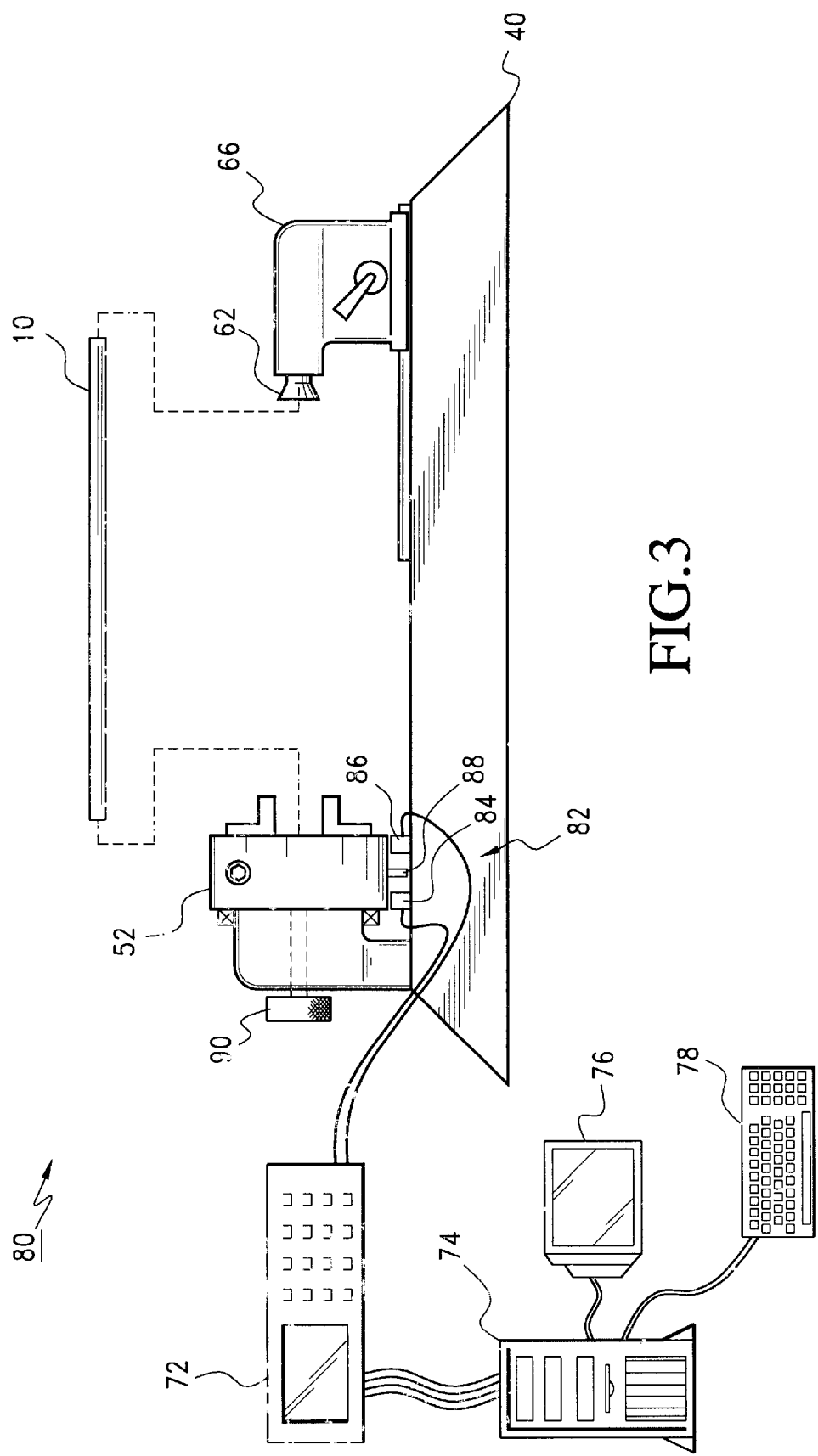
FIG. 3 is an alternative embodiment of an apparatus for measuring torsional stiffness incorporating a shaft encoder or photo gate for determining the frequency of oscillation of the inertial mass.

FIG. 3 depicts an alternative embodiment of an apparatus for measuring torsional stiffness 80 in which, a photo gate 82 comprising an emitter 84 and a detector 86 are used to measure the period of oscillation of chuck 52 in lieu of accelerometer 70. A peg 88 extending from chuck 52 breaks the beam of light passing from emitter 84 to detector 86 each time chuck 52 passes the neutral position. Accordingly, the frequency of oscillation can be determined based on the number of times the beam of light is broken by the passage of peg 88. Alternatively, a conventional shaft encoder 90 may be used to measure the period of oscillation of chuck 52.

Figure 4:
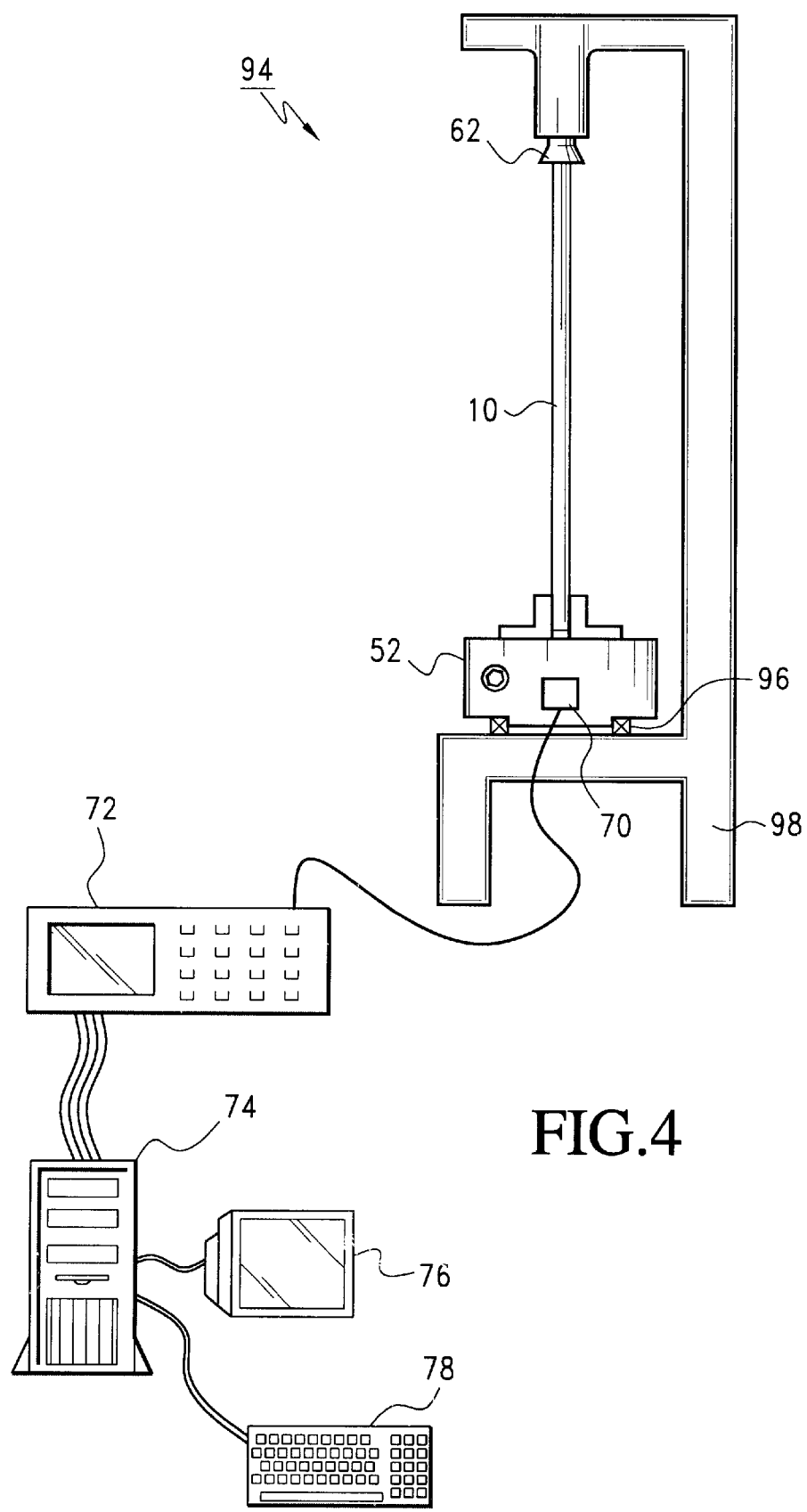
FIG. 4 is an alternative embodiment of an apparatus for measuring torsional stiffness of a golf club shaft in which the axis of the shaft is oriented vertically.

FIG. 4 is yet another alternative embodiment of an apparatus for measuring torsional stiffness of a shaft 94 in which shaft 10 is suspended such that the longitudinal axis of shaft 10 is oriented in the vertical direction relative to the earth's gravitational field. In the embodiment of FIG. 4, chuck 52 is supported for rotation by a conventional thrust bearing 96 supported by frame 98, however, chuck 52 may be suspended by shaft 10 itself, thereby eliminating the possibility of friction from bearing 96 affecting the measurements. As with the embodiment of FIG. 2, accelerometer 70 is mounted such that the axis of sensitivity is oriented in the tangential (circumferential) direction relative to chuck 52. Since the tangential direction is orthogonal to the earth's gravitational field, the circumferential position of accelerometer 70 on chuck 52 is irrelevant in the embodiment of FIG. 4.

Once the torsional spring constant is obtained from any of the foregoing apparatus, it can be expressed in conventional engineering units such as Newton meters per radian, foot pounds per radian, etc. or can be converted into the pure angular expressions used commonly in the art by multiplying the spring constant by the appropriate torque such as five foot pounds, one foot pound, etc.

Although certain preferred embodiments and methods have been disclosed herein, it will be apparent from the foregoing disclosure to those skilled in the art that variations and modifications of such embodiments and methods may be made without departing from the spirit and scope of the invention. For example, although a collet and chuck are disclosed as preferred methods of securing shaft 10 in the apparatus, any conventional means of holding a shaft such as a set screw, or a keyed adapter (where test specimens can be bonded with an end fitting) may be used to secure the shaft in the apparatus in accordance with the present invention. Similarly, although a digital computer is shown, any means of determining the frequency of oscillation and solving equation 5 is considered within the scope of the present invention. Accordingly, it is intended that the invention shall be limited only to the extent required by the appended claims and the rules and principles of applicable law.

What is claimed is:

1. Apparatus for measuring the torsional stiffness of a golf club shaft comprising:
   a frame;
   a first collet rigidly mounted to said frame, said collet comprising a first aperture adapted to grip a first end of a golf club shaft;
   a torsional weight, said torsional weight comprising a block of material having a first axis of rotation normal to a major surface of said block of material, said first axis of rotation further passing through the centroid of said torsional weight, said torsional weight having a polar moment of inertia about said first axis of rotation;
   a second collet rigidly mounted to said torsional weight, said second collet comprising a second aperture adapted to grip a second end of a golf club shaft; said second aperture being disposed substantially co-linear with said axis of rotation;
   a sensor adapted for measuring the frequency of oscillation of said torsional weight about said axis and,
   a bearing operatively disposed between said frame and said torsional weight for supporting said torsional weight on said frame for rotation about said first axis of rotation.

2. The apparatus of claim 1, wherein:
   said sensor is an accelerometer.

3. The apparatus of claim 1, wherein:
   said sensor is a shaft encoder.

4. The apparatus of claim 1, wherein:
   said sensor is a photo-gate.

5. The apparatus of claim 1, further comprising:
   means for applying an initial torsional displacement.

6. The apparatus of claim 1, wherein:
   said torsional weight has a predetermined moment of inertia.

7. The apparatus of claim 1, wherein said torsional weight is a right cylinder.

8. The apparatus of claim 1, wherein:
   the first aperture comprises an interior surface adapted to grip the first end of the golf club shaft such that the shaft is in a vertical orientation, and the second aperture comprises an interior surface adapted to grip the second end of the shaft such that the first axis of rotation is in a vertical orientation.

9. The apparatus of claim 8, wherein:
   said bearing is an axial thrust bearing.

10. The apparatus of claim 1, wherein said first collet is slidably supported by said frame for movement toward and away from second collet, said first collet further comprising means for releasably securing said first collet to said frame.

11. The apparatus of claim 1, further comprising:
    a computer having an input receiving a signal from said sensor indicative of said period of oscillation of said torsional weight, said computer including programming for converting said signal into an indicia of the stiffness of the golf club shaft.

12. Apparatus for measuring the torsional stiffness of a golf club shaft comprising:
    a frame;
    a first collet rigidly mounted to said frame, said collet comprising a first aperture adapted to grip a first end of a golf club shaft;
    a torsional weight, said torsional weight comprising a block of material having a first axis of rotation normal to a major surface of said block of material, said first axis of rotation further passing through the centroid of said torsional weight, said torsional weight having a polar moment of inertia about said first axis of rotation;
    a second collet rigidly mounted to said torsional weight, said second collet comprising a second aperture adapted to grip a second end of a golf club shaft; said second aperture being disposed substantially co-linear with said axis of rotation;
    a sensor adapted for measuring the frequency of oscillation of said torsional weight about said axis, wherein the first aperture comprises an interior surface adapted to grip the first end of the golf club shaft such that the shaft is in a horizontal orientation, and the second aperture comprises an interior surface adapted to grip the second end of the shaft such that the first axis of rotation is in a horizontal orientation, said apparatus further comprising a radial bearing supporting said torsional weight on said frame.

13. Apparatus for measuring the torsional stiffness of a golf club shaft comprising:
    a frame;
    a torsional weight, said torsional weight comprising a block of material having a cylindrical outer surface defining a first axis of rotation, said block having a weight polar moment of inertia about said first axis of rotation;

a bearing supporting said torsional weight on said frame, said bearing supporting said torsional weight for rotation about said first axis of rotation;

a tailstock slidably mounted to said frame and adapted to move along a second axis substantially parallel to said first axis of rotation, said tailstock further including means for rigidly locking said tailstock to said frame;

a first collet rigidly mounted to said tailstock, said first collet comprising a first aperture adapted to grip a first end of the golf club shaft, said first aperture defining a first aperture axis substantially collinear to said first axis of rotation;

a second collet rigidly mounted to said torsional weight, said second collet comprising a second aperture adapted to grip a second end of the golf club shaft, said second aperture defining a second aperture axis substantially collinear to said first axis of rotation; and a sensor adapted for measuring a period of oscillation of said torsional weight about said first axis of rotation.

14. The apparatus of claim 13, further comprising:

a computer having an input receiving a signal from said sensor indicative of said period of oscillation of said torsional weight, said computer including programming for converting said signal into an indice of the stiffness of the golf club shaft.

15. A method of determining the torsional stiffness of a golf club shaft comprising:

securing a first end of the golf club shaft to a rigid frame;

securing a second end of the golf club shaft to a torsional weight, said torsional weight comprising a plate having a centroid and a polar moment of inertia about a first axis of rotation through the centroid, said second end of the golf club shaft being secured to the torsional weight such that the longitudinal axis of the golf club shaft passes through the centroid of the torsional weight along the first axis of rotation;

applying a torque to the torsional weight to induce an initial torsional displacement;

releasing said torque to allow said torsional weight to oscillate about said first axis of rotation under the restoring torque exerted by the golf club shaft; and measuring the period of oscillation of the torsional weight about the first axis of rotation;

determining the polar moment of inertia of the torsional weight;

inputting the polar moment of inertia of the torsional weight into a computer program adapted for solving for the torsional stiffness from the equation $\sqrt{K/I}$;

inputting the frequency of oscillation into the computer program; and solving for the torsional stiffness of the golf club shaft.

16. The method of claim 15, wherein:

the measurement of the period of oscillation is carried out with an accelerometer mounted to the torsional weight.

17. The method of claim 15 wherein:

the measurement of the period of oscillation is carried out with a shaft encoder mounted to the torsional weight.

18. The method of claim 15 wherein:

the measurement of the period of oscillation is carried out with an optical gate.

* * * * *